United States Patent
Levandowski et al.

(10) Patent No.: US 10,053,111 B2
(45) Date of Patent: *Aug. 21, 2018

(54) METHOD FOR MAINTAINING ACTIVE CONTROL OF AN AUTONOMOUS VEHICLE

(71) Applicant: Uber Technologies, Inc., San Francisco, CA (US)

(72) Inventors: Anthony Levandowski, Berkeley, CA (US); Don Burnette, Mountain View, CA (US)

(73) Assignee: Uber Technologies, Inc., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/409,160

(22) Filed: Jan. 18, 2017

(65) Prior Publication Data

US 2017/0327126 A1 Nov. 16, 2017

Related U.S. Application Data

(63) Continuation of application No. 15/182,989, filed on Jun. 15, 2016, now Pat. No. 9,582,003.

(60) Provisional application No. 62/337,294, filed on May 16, 2016.

(51) Int. Cl.
*B60W 50/08* (2012.01)
*B60W 30/16* (2012.01)

(52) U.S. Cl.
CPC .......... *B60W 50/082* (2013.01); *B60W 30/16* (2013.01); *B60W 2540/10* (2013.01); *B60W 2540/12* (2013.01)

(58) Field of Classification Search
CPC ............... G05D 1/0088; B60W 40/08; B60W 2540/10; B60W 2540/12; B60W 50/082; B60W 30/16
USPC .......................................... 701/23
See application file for complete search history.

(56) References Cited

U.S. PATENT DOCUMENTS

| | | | | |
|---|---|---|---|---|
| 9,349,055 B1* | 5/2016 | Ogale | ................ | G06K 9/00791 |
| 2006/0089765 A1* | 4/2006 | Pack | .................... | G05D 1/0061 |
| | | | | 701/23 |
| 2014/0253722 A1* | 9/2014 | Smyth | ....................... | G01P 3/38 |
| | | | | 348/135 |
| 2016/0167663 A1* | 6/2016 | Sutton | ................ | B60K 17/3467 |
| | | | | 701/54 |
| 2016/0207530 A1* | 7/2016 | Stanek | ................... | B60W 30/09 |
| 2016/0252903 A1* | 9/2016 | Prokhorov | .......... | B60W 30/143 |
| | | | | 701/23 |

* cited by examiner

*Primary Examiner* — Anne Marie Antonucci
*Assistant Examiner* — James E Stroud
(74) *Attorney, Agent, or Firm* — Mahamedi IP Law LLP

(57) ABSTRACT

A method for operating an autonomous vehicle can involve monitoring a throttle position of a throttle pedal on the semi-autonomous vehicle. Once the throttle pedal is found to no longer be depressed, the vehicle can be returned to human control.

20 Claims, 2 Drawing Sheets

METHOD FOR MAINTAINING ACTIVE CONTROL OF AN AUTONOMOUS VEHICLE

CROSS-REFERENCE TO RELATED APPLICATIONS

This application is a continuation of U.S. application Ser. No. 15/182,989, entitled "METHOD FOR MAINTAINING ACTIVE CONTROL OF AN AUTONOMOUS VEHICLE," filed on Jun. 15, 2016, which claims priority benefit under 35 U.S.C. § 119(e) to U.S. Provisional Patent Application Ser. No. 62/337,294, filed May 16, 2016, entitled "METHOD FOR MAINTAINING ACTIVE CONTROL OF AN AUTONOMOUS VEHICLE;" the aforementioned applications being hereby incorporated by reference in their respective entireties.

BACKGROUND

The application relates to systems and methods for use with autonomous vehicles, particularly to maintain active physical control and monitoring of an autonomous vehicle by a human driver.

DESCRIPTION OF THE RELATED ART

Numerous parties have raised safety concerns with respect to autonomous, self-driving vehicles. Traditionally, vehicles are driven by human drivers, and that arrangement has an established safety record. Although autonomous vehicles might currently or in the future be safer than a human-driven vehicle, it may still be beneficial to ensure that a human driver is present and ready to take control if the autonomous vehicle appears to be driving in a dangerous manner. Further, regulations in certain jurisdictions may require the presence of a human driver, and some way to ensure that the human driver remains in active physical control of the vehicle, and actively monitors the vehicle. Thus, systems and methods that facilitate or require participation by a human driver can potentially improve operation and safety of the vehicle, and comply with regulatory requirements for the use of vehicles that may otherwise be capable of driving without a human driver. Further, it can be desirable to make this interaction between the human driver and the vehicle less burdensome.

Vehicles described herein may have certain autonomous-driving capabilities. However, to the extent that the active physical control and monitoring of a human driver is required, they would not be fully autonomous. Thus, such vehicles will be referred to herein as "semi-autonomous" vehicles.

SUMMARY

In one embodiment, a method of confirming the active presence of a human in a semi-autonomous vehicle is provided. A human's active physical control and monitoring of the semi-autonomous vehicle can be confirmed by detecting that a throttle pedal on a semi-autonomous vehicle is depressed relative to a non-actuated position. This can require the pedal be continuously depressed, or that the pedal is periodically depressed. The semi-autonomous driving of the vehicle can then continue while the active physical control and monitoring by the human is confirmed. When the throttle pedal on the semi-autonomous vehicle is detected as no longer being depressed, semi-autonomous driving can be terminated and the vehicle can be returned to normal human control.

In a further embodiment, a semi-autonomous vehicle can include one or more processors operatively connected to the vehicle to control the vehicle. The one or more processors can be configured to confirm that a human driver is actively physically controlling and monitoring the semi-autonomous vehicle by detecting that a throttle pedal on a semi-autonomous vehicle is depressed relative to a non-actuated position. Further, the one or more processors can be configured to drive the semi-autonomous vehicle semi-autonomously while the active physical control and monitoring by the human driver is confirmed. Once the one or more processors detect that the throttle pedal on the semi-autonomous vehicle is no longer being depressed, the semi-autonomous driving of the semi-autonomous vehicle can be terminated and control of the semi-autonomous vehicle can be returned to the human driver.

BRIEF DESCRIPTION OF THE DRAWINGS

These and other features, aspects, and advantages of the embodiments disclosed herein are described below with reference to the drawings of certain embodiments, which are intended to illustrate and not to limit certain aspects of the application. The following is a brief description of each of the drawings.

DETAILED DESCRIPTION

Figure 1:
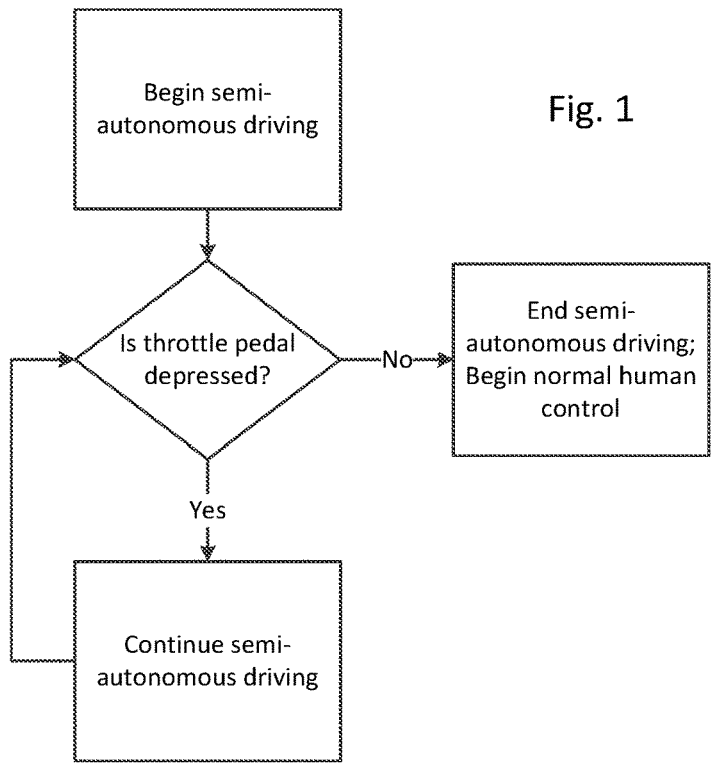
FIG. 1 depicts an embodiment process for confirming that a human driver is actively physically controlling and monitoring a semi-autonomous vehicle.

Various systems and methods are described herein for controlling a vehicle. The vehicle can include various components, such as a motor (for example, an internal combustion engine, electric motor, or other devices that provide motive power). The vehicle can also include mechanisms to transmit power from the motor into motion of the vehicle, such as transmissions, drive shafts, wheels, gears, etc. The vehicle can also include traditional vehicle actuators for a human driver to control operation of the vehicle, such as a steering wheel, throttle pedal, brake pedal, clutch pedal, emergency brake lever, ignition switch, and other components.

Even further the vehicle can include a computer system that can control various behaviors of the vehicle, independently or through the input of a human driver. The computer system can include one or more processors, one or more memories, and one or more communication mechanisms. In some embodiments, more than one computer can be used to execute the modules, methods, and processes discussed herein. Additionally, the modules, methods, and processes described herein can each run on one or more processors, on one or more computers; or the modules described herein can run on dedicated hardware. The computer system can include various input mechanisms, including the traditional vehicle actuators described above, as well as traditional computer input devices such as keyboards (one-handed or two-handed), mice, touch screens, voice commands and associated hardware, gesture recognition and associated hardware, or any other means of providing communication between a human and the computer system. The vehicle can also include a display that provides information to the driver from the computer system. The display can be a 2D or 3D display and can be based on any technology, such as LCD, LED, CRT, plasma, and projection. The display can also alternatively or additionally include other feedback devices such as a speaker or haptic feedback mechanism.

The vehicle can also include a variety of sensors, including sensors to detect the status of the control actuators, the status of other input devices, the status of the vehicle's other components (such as engine temperature, engine revolutions per minute, fluid levels, battery levels, etc.), environmental conditions (such as road conditions, nearby vehicles, and weather, using light detection and ranging (LiDAR) sensors, visual cameras, and other sensors), and location/direction (for example, GPS sensors, compasses, gyroscopes, and accelerometers).

Communication among the various components of the vehicle can be accomplished via any appropriate coupling, including Universal Serial Bus (USB), VGA cables, coaxial cables, FireWire, serial cables, parallel cables, SCSI cables, IDE cables, SATA cables, wireless based on 802.11 or Bluetooth, or any other wired or wireless connection(s). One or more of the components can also be combined into a single unit or module. In some embodiments, all of the electronic components are included in a single physical unit or module. Even further, the computer system can potentially communicate with a driver's personal mobile devices, such as a smart phone, tablet, laptop, or smart watch.

The computer system can be configured to control the movement of the vehicle, using data from the various sensors. For example, the computer system can control the acceleration and deceleration of the vehicle by actuating motors, brakes, or other components of the vehicle. Similarly, the computer system can control the direction of the vehicle by actuating various steering mechanisms. The computer system can potentially also control other non-driving components of the vehicle, such as power windows, windshield wipers and associated cleaning fluid dispensers, and side mirrors. The computer system can further be configured to make dynamic decisions related to the movement of the vehicle, such as making turns, changing lanes, passing other vehicles, stopping at red lights, parking, and other behaviors of standard driving. In this manner, the computer system can control the majority of substantive driving decisions that are traditionally performed by a human driver.

However, the computer system can also optionally be configured to accept inputs from a human driver to provide a varying level of human control over the vehicle. For example, the computer system can require that a human driver be present while the computer system controls certain aspects of the vehicle's movement. Even further, the computer system can optionally require that the human driver provide some level of active physical control of the vehicle, and active monitoring of both the vehicle itself and the vehicle's environment (such as where the vehicle is going). For example, the computer system can require high-level commands from a human driver (such as a route to take, when to change lanes, and what speed to drive), while the computer system manages low-level functions such as staying in a lane and avoiding collisions with other vehicles. In this way, the human driver can actively and continuously control the computer system, which then follows the human driver's commands to directly control the vehicle. This active and continuous control can also serve as a confirmation that the human driver is continuing to actively monitor the vehicle.

Mechanisms that verify that the human driver is providing this active control and monitoring can optionally be integrated with the traditional vehicle actuators of the vehicle, such as a steering wheel, throttle pedal, brake pedal, or clutch pedal. Maintaining the human driver's engagement with these traditional vehicle actuators provides the further benefit of putting the human driver in a position to immediately take control of the vehicle if necessary. Thus, sensors can be provided to electronically detect when and how the actuators are actuated by the human driver, and convert that into an electronic signal that can be transmitted to the computer system.

In some embodiments, the computer system can confirm that the human driver is actively physically controlling and monitoring the vehicle by requiring a constant action or position of one of the actuators. For example, the computer system can potentially monitor the position of the throttle pedal of a vehicle to confirm the human's active physical control and monitoring. Traditionally, depressing a throttle pedal would command a vehicle to commence motion or otherwise accelerate. In a similar manner, depressing the throttle can command the computer system to commence semi-autonomous driving of the vehicle, and once already started to continue semi-autonomous driving of the vehicle. Similarly, removal of pressure from the throttle, such that it returns to a non-depressed (unactuated or normal) position, can command the computer system to cease semi-autonomous driving of the vehicle and return it to normal human control. An embodiment system is depicted in FIG. 1.

As shown, the system can initially begin semi-autonomous driving. Semi-autonomous driving can commence based on a command from a human driver through a user input device (such as a traditional vehicle actuator or a computer input device). If the user input device is the throttle pedal, a quick and strong pump of the throttle pedal is one example of a command from the human driver to the vehicle to commence semi-autonomous driving. The vehicle can then optionally confirm that semi-autonomous driving has commenced by outputting a signal to a user, such as on a screen, with a sound, or with an adjustment to normal car behavior such as a brief acceleration or a brief deceleration. The brief acceleration or deceleration can be separate in time from a pump of the throttle pedal or other input to make clear that it is a result of semi-autonomous driving instead of the normal feedback from a non-autonomous vehicle upon movement of the pedal (or another actuator used). Similar systems can be used to indicate to a human driver that the car cannot or will not drive semi-autonomously (for example, during a time considered unsafe for non-human drivers), such as with a sudden deceleration.

The vehicle can then continuously monitor an actuator, such as the throttle pedal as discussed above and shown in FIG. 1, to verify that the human driver remains in active physical control and continues to monitor the vehicle. Once the system detects that depression of the throttle pedal (either continuous or periodic) has ended, semi-autonomous driving can be terminated, and control can be returned to the human driver. In some embodiments, this can be a complete handover of control, with the computer system immediately ending control of the vehicle. In other embodiments, the handover of control can be delayed or partially delayed. For example, if the throttle pedal ceases to be depressed, the computer system might release control of the throttle (allowing the vehicle to gradually decelerate, optionally with an additional light braking) while maintaining control of steering until human control of steering is confirmed (such as by detecting a force on the steering wheel from a human, or otherwise detecting a human's hands on the wheel). The system can then either allow the vehicle to slow to a complete stop, or maintain a reduced speed if stopping is considered unsafe by the computer system at that time. Alternatively, the system can look for other inputs for confirmation of human control before completing the handover to human control, such as looking for a subsequent depression of the throttle pedal or using sensors to detect hands on the steering wheel. Further, in some embodiments the computer system might provide an alert to the human driver (such as a loud noise or flashing visual message) to indicate that control is being returned to the human driver.

Other traditional vehicle actuators can also be used for controlling when the computer system semi-autonomously drives the vehicle. For example, depression of a brake pedal can also indicate that the computer system should stop semi-autonomous driving and return to normal human control. However, a depression of the brake pedal could also occur accidentally. Thus, it might be preferable to require a strong and continuing depression of the brake pedal, to distinguish incidental/accidental pressing of the brake pedal from deliberate actions. Even further, it may be preferable to require a sudden and extreme depression of the brake pedal, as a human driver would normally do to execute an emergency stop. This has the additional benefit of being an intuitive action for those accustomed to normal driving who, while monitoring the semi-autonomous vehicle, recognize a hazard that requires an immediate stop. Further, the conversion to normal human control, while the brake pedal is extremely depressed, would yield the emergency brake action that is presumably desired. This can contrast with removing pressure from the throttle pedal to return the vehicle to normal human control, which would result in a gradual deceleration absent further input from the human driver.

In further embodiments, semi-autonomous driving can be stopped and normal human control can be instituted upon a sudden and extreme depression of the throttle pedal. Such an action may be necessary if a sudden acceleration is necessary and not recognized by the computer system.

In even further embodiments, sensors can be used to verify the presence of a human driver without using traditional vehicle actuators such as the pedals or steering wheel. For example, a human's presence in the driver's seat can be verified using a seat belt sensor, a seat weight sensor, or other devices. Other sensors can also be used, such as traditional computer input devices. When the human's presence is not detected, the vehicle can terminate semi-autonomous driving and return control to the human driver or otherwise drive in a safer manner (such as bringing the vehicle to a stop or driving more cautiously).

Additionally, the computer system can optionally require more complex movements of the control actuators to initiate, continue, or terminate semi-autonomous driving. For example, the computer system might require that the throttle pedal be continuously moved by the human driver some predetermined amount to further verify that the driver is also awake or otherwise monitoring the vehicle. However, this required motion can also be minimized to reduce potential driver fatigue. In some embodiments, movement may be required periodically, such as at least every 10 seconds, 30 seconds, or minute. Further, in some embodiments the human driver may be prompted by the computer system to make such a movement to confirm that the human driver is still monitoring the vehicle. In some embodiments, the constant (continuous or periodic) movement of the pedal can be required in addition to keeping the pedal depressed. In other embodiments, the pedal does not need to be kept continuously depressed, as long as it is occasionally depressed to yield the constant movement.

Movement patterns of the control actuators can also provide more complex commands to the computer system. For example, in some embodiments the extent to which the throttle pedal is depressed can indicate a degree to which the computer system should semi-autonomously drive the vehicle. Most intuitively, the extent to which the throttle pedal is depressed can indicate a maximum speed or maximum motive power during semi-autonomous driving, with increased depression indicating increased speed or power in a linear or non-linear manner. The amount of depression of the throttle pedal can also affect other semi-autonomous driving behavior, such as the tendency of the system to pass slower-moving vehicles, allow faster-moving vehicles to pass or merge in front of the semi-autonomous vehicle, or a following distance from another vehicle in front of the semi-autonomous vehicle. The correspondence between throttle pedal position and speed, power, or other driving behaviors can be relative to an absolute scale (such as specific pedal positions corresponding to specific speeds) or a relative scale based, for example, on normal driving. Examples of relative scales can be a speed relative to the speed of other vehicles nearby, a speed relative to normal traffic patterns on the current road or similar roads, speed relative to the legal speed limits on the current road, speed relative to safe driving speeds under current conditions (for example, nearby vehicles, nearby pedestrians, nearby bicyclists, narrow roads, uneven roads, and weather conditions such as rain, snow, or fog), or some combination of factors. Thus, these behaviors can potentially be adjusted continuously by continuously monitoring the position of the throttle pedal. These factors can also be applied to other driving behaviors other than speed.

Similar commands could also be provided using the brake pedal. Further it may be desirable for the brake pedal to operate in a reverse manner relative to the throttle pedal, such that marginal depression of the brake pedal marginally lowers maximum speed, power, and other behavior.

Further, movement of the actuators of the vehicle can provide other discrete commands. For example, a sudden and light depression (or pump) of the throttle can be interpreted as a discrete command (such as a binary input) to the computer system. The computer system can be configured to recognize this as another sort of command, and thus not treat this as a change in a continuous command such as those described above regarding setting a maximum speed or motive power, and further to distinguish this from sudden and extreme actions such as during an emergency stop. Thus, when such a pump (or similar discrete command) is recognized, the command can be recognized without treating the throttle pedal movement as an adjustment of other continuous commands.

Figure 2:
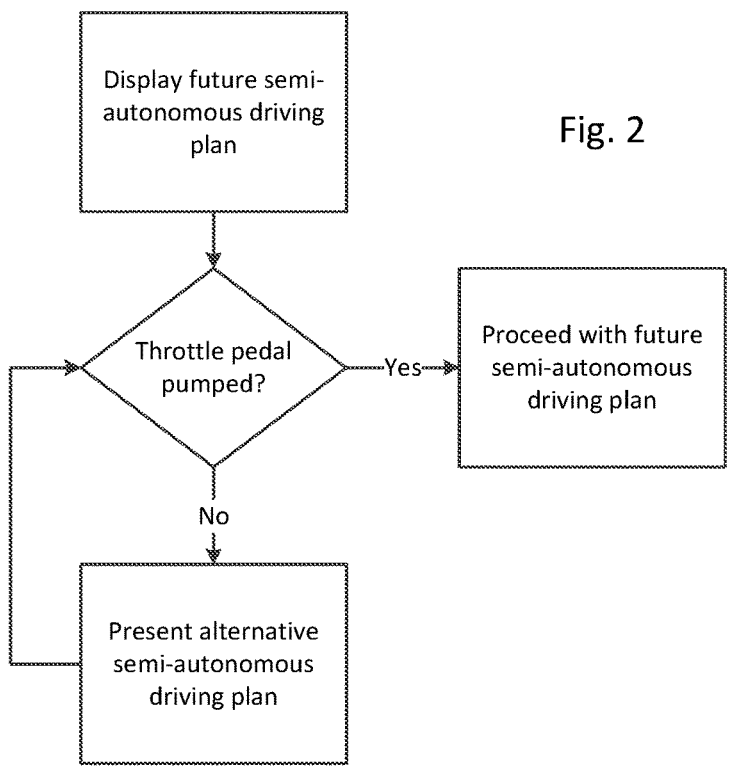
FIG. 2 depicts an embodiment process for a human driver confirming or rejecting a future semi-autonomous driving plan.

In some cases, the discrete command can be in response to a prompt from the computer system to the human driver, such as through a visual display, speaker, or haptic device. For example, the computer system might indicate a future plan for semi-autonomous driving to the human driver on a display. The future plan can be an immediate plan, such as a plan to pass a slow-moving vehicle or change lanes. The future plan can also be a long-term plan, such as choosing between alternative routes or where to stop for refueling. The pump movement can then be interpreted by the computer system as a confirmation of the plan by the human driver. The absence of the pump, two pumps, or some other pedal movement pattern can be interpreted by the computer system as the human driver declining the future plan. If the plan is declined, the computer system can default to a previous plan, or propose an alternative plan to be confirmed or denied in a similar manner. An embodiment system is depicted in FIG. 2.

Other discrete commands can also be inputted in this manner, such as commands related to a cruise control mechanism. Once a desired speed is reached, the user can optionally pump the throttle pedal to indicate that the speed should be maintained. A subsequent pump can indicate that the cruise control can be terminated and that the vehicle should resume normal semi-autonomous adjustments of the speed of the vehicle.

Figure 3A:
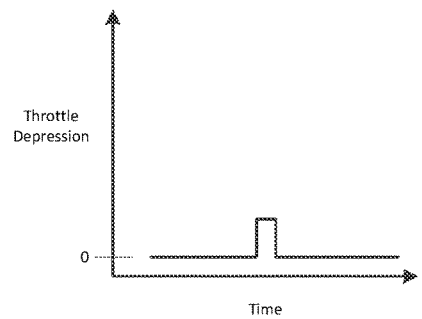
FIGS. 3A-3H depict a variety of pedal movement patterns on graphs showing throttle position with respect to time.
Figure 3B:
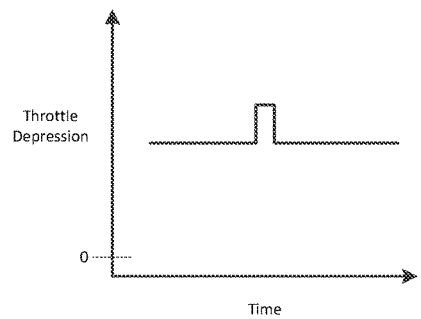
Figure 3C:
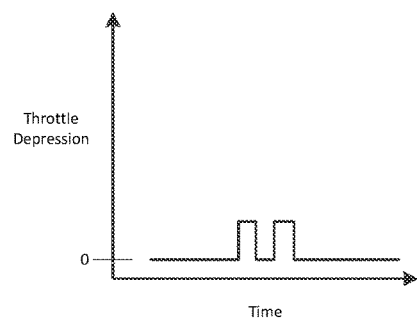
Figure 3D:
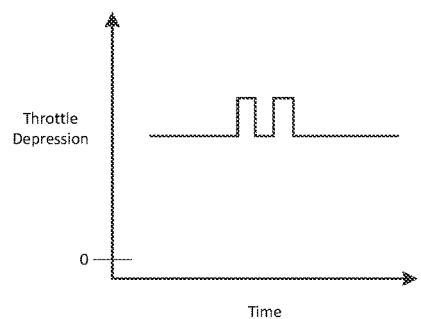
Figure 3E:
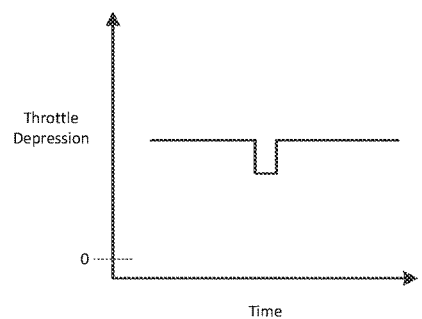
Figure 3F:
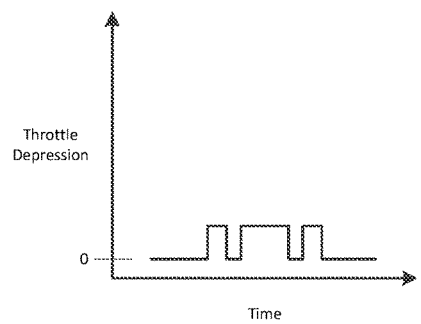
Figure 3G:
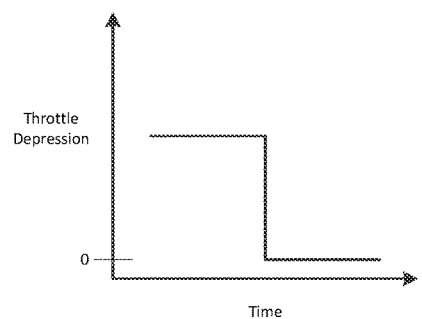
Figure 3H:
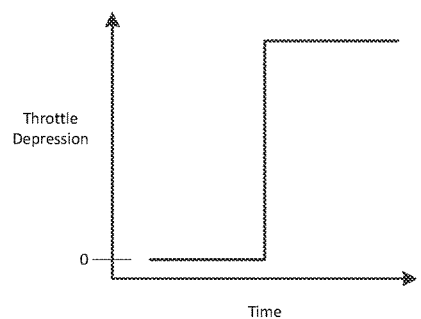

FIGS. 3A-3H indicate a variety of pedal movement patterns that can be used to input commands to the computer system. The graphs indicate the extent of throttle depression with respect to time, with "0" indicating the undepressed position. FIG. 3A indicates a quick and light pump of the throttle pedal from an undepressed position. This can be used to provide a discrete command to the computer system, verify active physical control and monitoring, and provide other inputs to the computer system. FIG. 3B indicates a quick and light pump of the throttle pedal from an already-depressed position, which can otherwise be similar to the pump of FIG. 3A. FIGS. 3C and 3D depict two pumps, similar to the single pump in FIGS. 3A and 3B, potentially indicating a different command. FIG. 3E indicates a release pump, where the throttle pedal is quickly and slightly released from a depressed position in a manner opposite but otherwise similar to the pump in FIG. 3B. FIG. 3F indicates a set of pumps with different durations. A pattern of long and short pumps can be used to indicate a variety of inputs to the computer system. In some embodiments, at least one single command can correspond to a pattern of three pumps, four pumps, or five pumps. FIG. 3G indicates a complete release of the throttle pedal, which might indicate that the computer system should return control to a human driver. FIG. 3H indicates a sudden and extreme depression of the throttle pedal, which can also potentially indicate that the computer system should return control to a human driver.

Actuators and input devices other than the throttle pedal can also provide these commands. For example, if a clutch pedal is available, it can be used to provide a separate signal to the computer system. Similarly, rotations of the steering wheel can also be used to input commands to the computer during semi-autonomous driving. Other input devices such as buttons, touch screens, keyboards, etc. can also be used to input commands. In particular embodiments, commands can be input through devices that do not require the use of a human's hands.

Even further, although the embodiments are described in the context of semi-autonomous driving, the commands described herein can also be used in fully autonomous vehicles that do not require confirmation of an active human driver. For example, light pumps of the throttle pedal can be used to input commands, whether or not the throttle must be maintained in a depressed position to continue autonomous or semi-autonomous driving of the vehicle. Thus, the features described herein can be combined with both semi-autonomous vehicles and fully autonomous vehicles.

Additionally, although the systems and methods may be primarily described in the context of an automobile such as a car, sedan, truck, or tractor unit, other vehicles can also use the systems and methods described herein, such as a motorcycle, boat, or airplane. Further, pre-existing non-autonomous vehicles can be modified to be autonomous or semi-autonomous using the systems and methods described herein. Such vehicles might not already include sophisticated user interfaces, and thus allowing commands to be input by the human driver using traditional vehicle actuators is particularly advantageous.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various algorithm steps described in connection with the embodiments disclosed herein can be implemented as electronic hardware, computer software, or combinations of both. To clearly illustrate this interchangeability of hardware and software, various illustrative steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative steps described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor can also include primarily analog components. A computing environment can include any type of computer system, including, but not limited to, a computer system based on a microprocessor, a mainframe computer, a digital signal processor, a portable computing device, a personal organizer, a device controller, and a computational engine within an appliance, to name a few.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others.

What is claimed is:

1. A method of operating a semi-autonomous vehicle, the method being performed by one or more processors and comprising:
    operating one or more vehicle actuators to semi-autonomously drive the semi-autonomous vehicle, the one or more vehicle actuators including a throttle pedal;
    monitoring a throttle position of the throttle pedal; and
    based on the throttle pedal not being depressed, terminating semi-autonomous driving of the semi-autonomous vehicle and returning the semi-autonomous vehicle to human control.

2. The method of claim 1, wherein the one or more processors terminate semi-autonomous operation in response to detecting that the throttle pedal has not been depressed for a predetermined period of time.

3. The method of claim 1, wherein the one or more processors semi-autonomously operate the plurality of vehicle actuators based on the throttle pedal being depressed.

4. The method of claim 3, further comprising:
    detecting the throttle position of the throttle pedal when depressed; and
    adjusting a semi-autonomous driving behavior of the semi-autonomous vehicle according to the throttle position when depressed.

5. The method of claim 4, wherein adjusting the semi-autonomous driving behavior comprises adjusting a maximum speed during semi-autonomous driving of the semi-autonomous vehicle.

6. The method of claim 4, wherein adjusting the semi-autonomous driving behavior comprises adjusting a maximum motive power during semi-autonomous driving of the semi-autonomous vehicle.

7. The method of claim 4, wherein adjusting the semi-autonomous driving behavior comprises adjusting at least one of a following-distance of the semi-autonomous vehicle or a tendency to pass other vehicles by the semi-autonomous vehicle.

8. The method of claim 1, wherein terminating semi-autonomous operation of the semi-autonomous vehicle comprises detecting that the throttle pedal has been released.

9. The method of claim 1, further comprising:
    displaying, on a display screen of the semi-autonomous vehicle, a future plan of semi-autonomous driving; and
    confirming approval of the future plan by detecting a movement pattern of the throttle pedal.

10. The method of claim 9, wherein the future plan comprises an immediate plan of semi-autonomous driving.

11. The method of claim 9, wherein the future plan comprises a long-term route for semi-autonomous driving.

12. The method of claim 9, wherein the movement pattern of the throttle pedal comprises a pump of the throttle pedal.

13. The method of claim 1, further comprising:
    detecting a sudden and extreme depression of the throttle pedal; and
    in response to detecting the sudden and extreme depression of the throttle pedal, terminating semi-autonomous driving of the semi-autonomous vehicle and returning the semi-autonomous vehicle to human control.

14. The method of claim 1, wherein the one or more vehicle actuators further include a brake pedal, the method further comprising:
    detecting a sudden and extreme depression of the brake pedal; and
    in response to detecting the sudden and extreme depression of the brake pedal, terminating semi-autonomous driving of the semi-autonomous vehicle and returning the semi-autonomous vehicle to human control.

15. A control system for a semi-autonomous vehicle comprising:
    one or more processors executing programmable logic, causing the one or more processors to:
        operate one or more vehicle actuators to semi-autonomously drive the semi-autonomous vehicle, the one or more vehicle actuators including a throttle pedal;
        monitor a throttle position of the throttle pedal; and
        based on the throttle pedal not being depressed, terminate semi-autonomous driving of the semi-autonomous vehicle and returning the semi-autonomous vehicle to human control.

16. The control system of claim 15, wherein the executed programmable logic causes the one or more processors to terminate semi-autonomous operation in response to detecting that the throttle pedal has not been depressed for a predetermined period of time.

17. The control system of claim 15, wherein the executed programmable logic causes the one or more processors to semi-autonomously operate the plurality of vehicle actuators based on the throttle pedal being depressed.

18. A semi-autonomous vehicle comprising:
    one or more vehicle actuators, including a throttle pedal; and
    one or more processors executing programmable logic, causing the one or more processors to:
        operate the one or more vehicle actuators to semi-autonomously drive the semi-autonomous vehicle;

monitor a throttle position of the throttle pedal; and
based on the throttle pedal not being depressed, terminate semi-autonomous driving of the semi-autonomous vehicle and returning the semi-autonomous vehicle to human control.

19. The semi-autonomous vehicle of claim 18, wherein the executed programmable logic causes the one or more processors to terminate semi-autonomous operation in response to detecting that the throttle pedal has not been depressed for a predetermined period of time.

20. The semi-autonomous vehicle of claim 18, wherein the executed programmable logic causes the one or more processors to semi-autonomously operate the plurality of vehicle actuators based on the throttle pedal being depressed.

* * * * *